United States Patent [19]
Futami et al.

[11] Patent Number: 4,978,137
[45] Date of Patent: Dec. 18, 1990

[54] SYSTEM AND METHOD FOR CONTROLLING POSTURE OF STEERING WHEEL FOR VEHICLE

[75] Inventors: Tohru Futami; Naoki Yuzuriha, both of Kanagawa, Japan

[73] Assignee: Nissan Motor Co., Ltd., Yokohama, Japan

[21] Appl. No.: 418,043

[22] Filed: Oct. 6, 1989

[30] Foreign Application Priority Data

Oct. 6, 1988 [JP] Japan .................... 63-250810
Dec. 28, 1988 [JP] Japan .................... 63-334672

[51] Int. Cl.$^5$ ............................................. B62D 1/18
[52] U.S. Cl. ................................. 280/775; 364/425; 74/493
[58] Field of Search ................ 280/775; 364/425; 74/493

[56] References Cited
U.S. PATENT DOCUMENTS

| | | | |
|---|---|---|---|
| 4,503,504 | 3/1985 | Suzumura et al | 280/775 |
| 4,752,085 | 6/1988 | Yamamoto | 280/775 |
| 4,775,939 | 10/1988 | Nakashima et al. | 364/424.05 |
| 4,785,684 | 11/1988 | Nishikawa et al. | 280/775 |
| 4,796,481 | 1/1989 | Nolte | 280/775 |

FOREIGN PATENT DOCUMENTS

0139295 5/1985 European Pat. Off. .
0213482 3/1987 European Pat. Off. .
61-263870 11/1986 Japan .

*Primary Examiner*—Kenneth R. Rice
*Attorney, Agent, or Firm*—Pennie & Edmonds

[57] ABSTRACT

A system and method for controlling a posture of a steering wheel for a vehicle are disclosed in which a steering wheel is so structured that a posture of the steering wheel can be changed between a driving position at which the vehicle driver (occupant) can appropriately handle the steering wheel to drive the vehicle and an escape position at which the steering wheel is jumped up to facilitate getting on and off the vehicle according to situations in which an ignition key is inserted or removed into or from a corresponding key switch hole, an uppermost stage position taken for the driving position is set at an angle of the steering wheel between the escape position and a lowest limit of the driving position, the steering wheel is automatically returned to the uppermost stage position when the ignition key is inserted into the key switch hole, and the steering wheel is manually adjustable only when the steering wheel is placed between the uppermost stage position and the lowest limit of the driving position. Therefore, the system and method according to the present invention can achieve both of easiness in the driver's getting on and off the vehicle when the steering wheel is placed at the escape position and an ensured operation of an air bag installed in the steering wheel for preventing driver's body (head) from impinging on the steering wheel when the vehicle collides with an obstacle present in front of the vehicle.

11 Claims, 13 Drawing Sheets

| | H | I | J |
|---|---|---|---|
| BROKEN LINE | 0 | 0 | Vcc |
| SHORT | 0 | 0 | NORMAL |

SYSTEM AND METHOD FOR CONTROLLING POSTURE OF STEERING WHEEL FOR VEHICLE

BACKGROUND OF THE INVENTION (1) Field of the Invention

The present invention relates generally to a system and method for controlling a posture of a steering wheel applicable to a vehicle which achieve easiness in vehicle driver's getting on and off the vehicle.

(2) Description of the Background Art

A Japanese Patent Application First Publication Showa 61-263870 published on Nov. 21, 1986 exemplifies a previously proposed steering wheel posture controlling system.

In the previously proposed posture controlling system, the posture of the steering wheel may be modified between a driving position (an adjusted position appropriate to the driving) and a escape position (a highest limit position upto which the steering position is adjusted and is escaped for making getting on and off of the driver easy) in response to an insertion and removal of an ignition key into and from a vehicle key switch hole. In addition, the driving posture of the steering wheel can be adjusted at an arbitrary position (including the escape position). At the escape position, a space between the steering wheel and driver's seat is widened so as to enable easy getting on and off for the driver.

In a case where an air bag used for preventing the vehicle driver's body from impinging on the steering wheel due to an inertia force of the vehicle is mounted in the vehicle and the escape posture of the steering wheel is set high in order to secure a sufficient easiness in getting on and off the vehicle driver, an angle of the steering wheel with respect to a corresponding instrument panel results in a state not appropriate to the air bag operation when a tilt angle adjustment of the steering wheel is made. Then, if a weight of the vehicle driver is acted toward the steering wheel, the air bag might be expanded toward a forward direction (rear side) of the steering wheel. Therefore, in the previously proposed posture controlling system, the escape posture which can be set to the highest limit of the driving posture cannot be set so higher, the easiness in getting on and off the vehicle cannot help being sacrificed.

On the other hand, when a compatibility between an appropriate operation of the air bag and improvement in getting on and off the vehicle driver is established, it becomes necessary to press the air bag from the frontward direction by means of an auxiliary member which simultaneously operates together with an expansion of the air bag. Therefore, a structure of the periphery of the airbag and steering wheel becomes complex and the number of parts may be increased.

SUMMARY OF THE INVENTION

It is an object of the present invention to provide an improved system and method for controlling a posture of a steering wheel for a vehicle which can achieve an ensured function of an air bag by limiting a highest limit position of the driving posture when the position of the steering wheel is manually adjusted although a change in posture between a driving posture and a sufficient escape posture in response to the insertion and removal of the ignition key.

The above-described object can be achieved by providing a system for controlling a posture of a steering wheel for a vehicle, comprising: (a) a steering wheel system having a steering wheel which can change its posture with respect to a related occupant seat between a first position at which a vehicle driver can handle the steering wheel to drive the vehicle and a second position at which the steering wheel is jumped up to make the driver easy to get on and off the vehicle according to situations in which an ignition key is inserted into a corresponding key hole of the vehicle and in which the ignition key is removed from the corresponding key hole; (b) first means for setting a third position between a lowest limit of the first position and second position, the third position defined as a highest position limit upto which the driver can handle the steering wheel; (c) second means for automatically returning the steering wheel at least to the third position from the second position when the ignition key is inserted into the corresponding hole; (d) third means for manually operating the steering wheel so as to adjust the steering wheel posture; and (e) fourth means for limiting the operation of the steering wheel by the third means so as to enable of the operation thereby only when the steering wheel is placed between the third position and lowest limit of the first position.

The above-described object can also be achieved by providing a system for controlling a posture of a steering wheel for a vehicle, comprising: (a) a steering wheel system having a steering wheel which can change its posture with respect to a related occupant seat between a first position at which a vehicle driver can handle the steering wheel to drive the vehicle and a second position at which the steering wheel is jumped up to make the driver easy to get on and off the vehicle according to situations in which an ignition key is inserted into a corresponding key hole of the vehicle and in which the ignition key is removed from the corresponding key hole; (b) first means for setting a third position between a lowest limit of the first position and second position, the third position defined as a highest position limit upto which the driver can handle the steering wheel; (c) second means for automatically returning the steering wheel at least to the third position when the ignition key is inserted into the corresponding hole; (d) third means for detecting whether an overload is generated on the steering wheel during the change in posture of the steering wheel; (e) fourth means for halting the change in posture of the steering wheel when the third means detects the generation of the overload on the steering wheel; (f) fifth means for detecting a vehicle run; and (g) sixth means responsive to the detection of the vehicle run for driving the steering wheel to automatically change in posture of the steering wheel at least toward the third position when the position of the steering wheel is not placed between the third position and lowest limit of the first position.

The above-described object can also be achieved by providing a method for controlling a steering wheel posture for a vehicle, comprising the steps of: (a) providing a steering wheel system having a steering wheel which can change its posture with respect to a related occupant seat between a first position at which a vehicle driver can handle the steering wheel to drive the vehicle and a second position at which the steering wheel is jumped up to make the driver easy to get on and off the vehicle according to situations in which an ignition key is inserted into a corresponding key hole of the vehicle and in which the ignition key is removed from the corresponding key hole; (b) setting a third position between a lowest limit of the first position and second position, the third position defined as a highest position limit upto which the driver can handle the steering wheel; (c) automatically returning the steering wheel at least to the third position from the second position when the ignition key is inserted into the corresponding hole; (d) manually operating the steering wheel so as to adjust the steering wheel posture; and (e) limiting the operation of the steering wheel in the step (c) so as to enable of the operation therein only when the steering wheel is placed between the third position and lowest limit of the first position.

DETAILED DESCRIPTION OF THE PREFERRED EMBODIMENTS

Reference will hereinafter be made to the drawings in order to facilitate a better understanding of the present invention.

Figure 1:
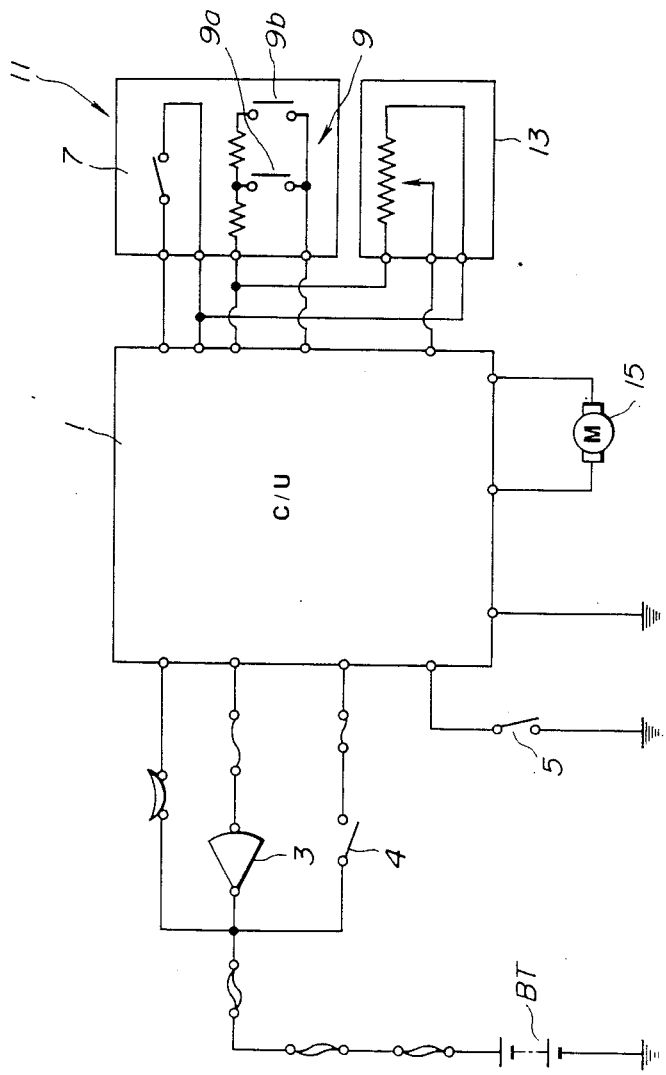
FIG. 1 is a circuit block diagram of a steering wheel posture controlling system for a vehicle in a first preferred embodiment according to the present invention.

FIG. 1 shows a circuit block diagram of a steering wheel posture controlling system in a first preferred embodiment according to the present invention.

A microcomputer 1 is installed which is constituted by a one-chip LSI (Large Scale Integrated circuit) having a CPU (Central processing Unit), ROM (Read Only Memory), and RAM (Random Access Memory). The microcomputer 1 reads an necessary information in accordance with programs stored in the ROM.

An input port of the microcomputer 1 is connected to a starter switch 3, an ignition key 4, a key position switch 5, and auto set switch 7, and a tilt switch 11 having an auto set switch 7 and manual switch 9, and a potentiometer 13.

An output port of the microcomputer 1 is connected to a steering tilt motor 15 as driving means MO which changes the posture of the steering wheel SW.

Figure 2:
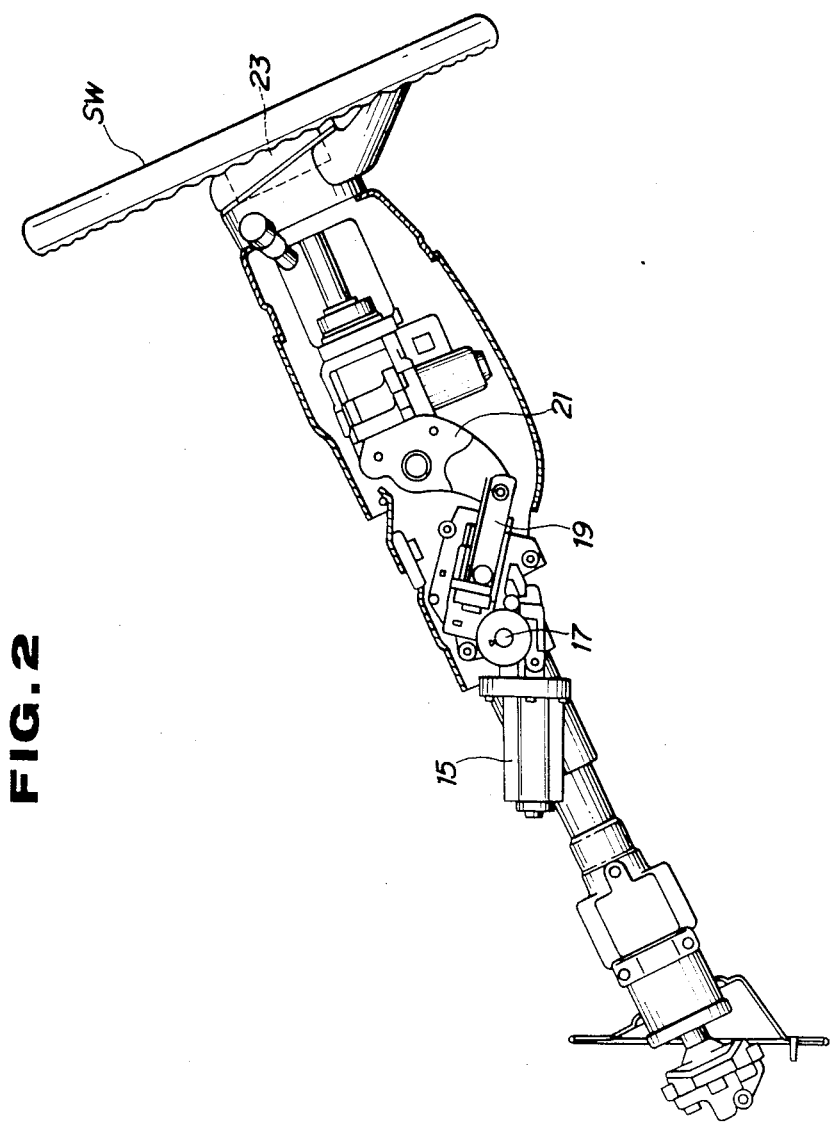
FIG. 2 is a cross sectional view of a steering wheel to which the present invention is applicable.

The following explains the steering wheel structure with reference to FIG. 2.

As shown in FIG. 2, the steering wheel SW drives a slider 19 in its frontward and rearward directions via a speed reduction mechanism 17 by driving a steering tilt motor 15. The steering wheel can be tilted in its upward and rearward directions via an upper bracket 21.

A stroke enabling range of the steering wheel SW is defined as a space between a highest stage position B capable of taking a driving posture and a position at which a jumped-up steering wheel is placed to take an escape posture. Between these positions A and B, an uppermost position for the driving posture C is set. This setting is executed by returning means.

An air bag 23 is installed within the steering wheel SW. The air bag 23 can be expanded in operation so as to relieve and prevent damage of a vehicle driver's body (particularly face portion) when a collision with an obstacle in a frontward direction of the vehicle occurs.

In the first preferred embodiment, an appropriate operation of the air bag 23 can be achieved at a position below the above-described driving posture.

In FIG. 1, the starter switch 3 detects an operation and/or non-operation of the starter motor. When the ignition switch is turned to on, the starter becomes operative. When the switch is turned to off, the starter becomes inoperative.

A key position switch 5 detects whether an insertion or removal of the ignition key into or from the corresponding key hole. When the ignition key is inserted, the key position switch 5 is closed (ON). When the ignition key is removed, the key position switch is open (OFF).

An auto set switch 7 is operated when the posture of the steering wheel SW is automatically changed between the driving posture and escape posture.

With the auto set switch 7 turned ON, the steering wheel SW is automatically jumped up upto a jump up position A which takes the escape posture during the driver getting off the vehicle. In addition, when the ignition key is inserted during the driver getting on, the returning means RT (microcomputer 1) is acted upon to return the steering wheel SW to a position at which the driver handles the steering wheel to run the vehicle during the vehicle driver getting off and which the microcomputer 1 stores (Stroke X in FIG. 5). When the automatic return is carried out, the ignition key causes the starter motor to be operated. At this time, the stop means ST (microcomputer 1) has a priority higher than the returning means RT. When the steering tilt motor 15 is stopped, the starting operation can be carried out in a stable state.

A manual switch 9 (connected with the microcomputer 1) constitutes operating means which changes the posture in response to an manual operation (by the driver) of the steering wheel posture. The manual switch 9 includes a tilt-up switch 9a and tilt-down switch 9b. With the tilt-up switch 9a turned on, the steering tilt motor 15 rotates in its reverse direction to raise the steering wheel SW to alter the posture of driving at the uppermost stage C. In addition, when the tilt-down switch 9b is turned to ON, the steering tilt motor 15 rotates normally so that the steering wheel SW is lowered to change the posture at the driving posture lowermost stage B.

The microcomputer 1 stores the posture of the steering wheel SW after the operation of the steering tilt motor 15 has been completed corresponding to the operation of the manual switch 9 in response to the output signal of the potentiometer 13.

The limiting means RT (microcomputer 1) makes an operation of the manual switch 9 possible only between a lowermost position B and uppermost position C of the driving posture by means of limiting means RT. Hence, an appropriate operation of the air bag 23 becomes possible.

Figure 4:
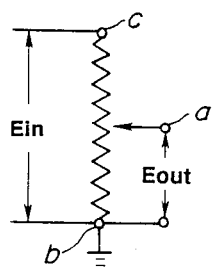
FIG. 4 is an explanatory view of a potentiometer used in the first preferred embodiment shown in FIG. 1.
Figure 5:
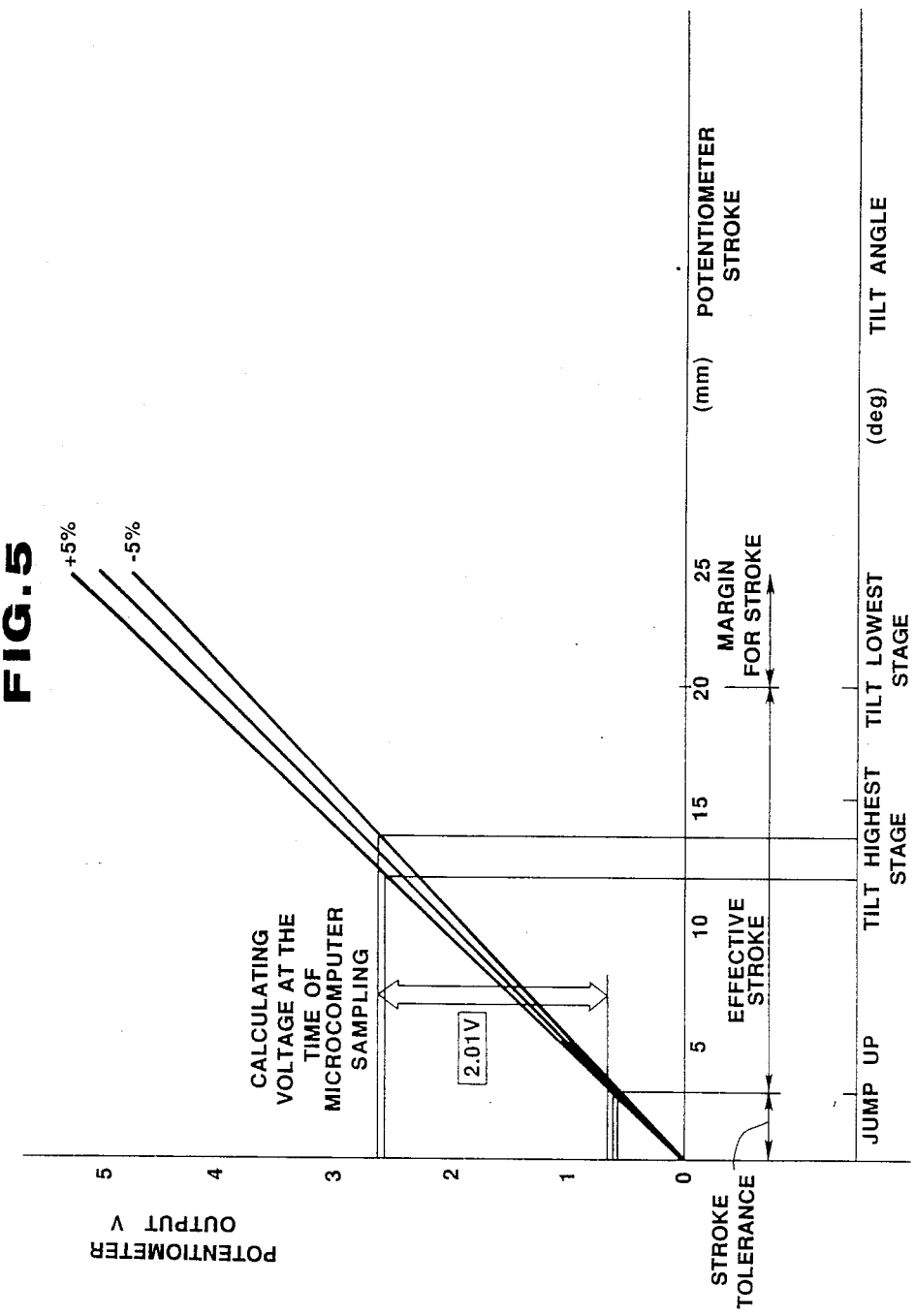
FIGS. 5 and 6 are characteristic graphs of potentiometer outputs.
Figure 6:
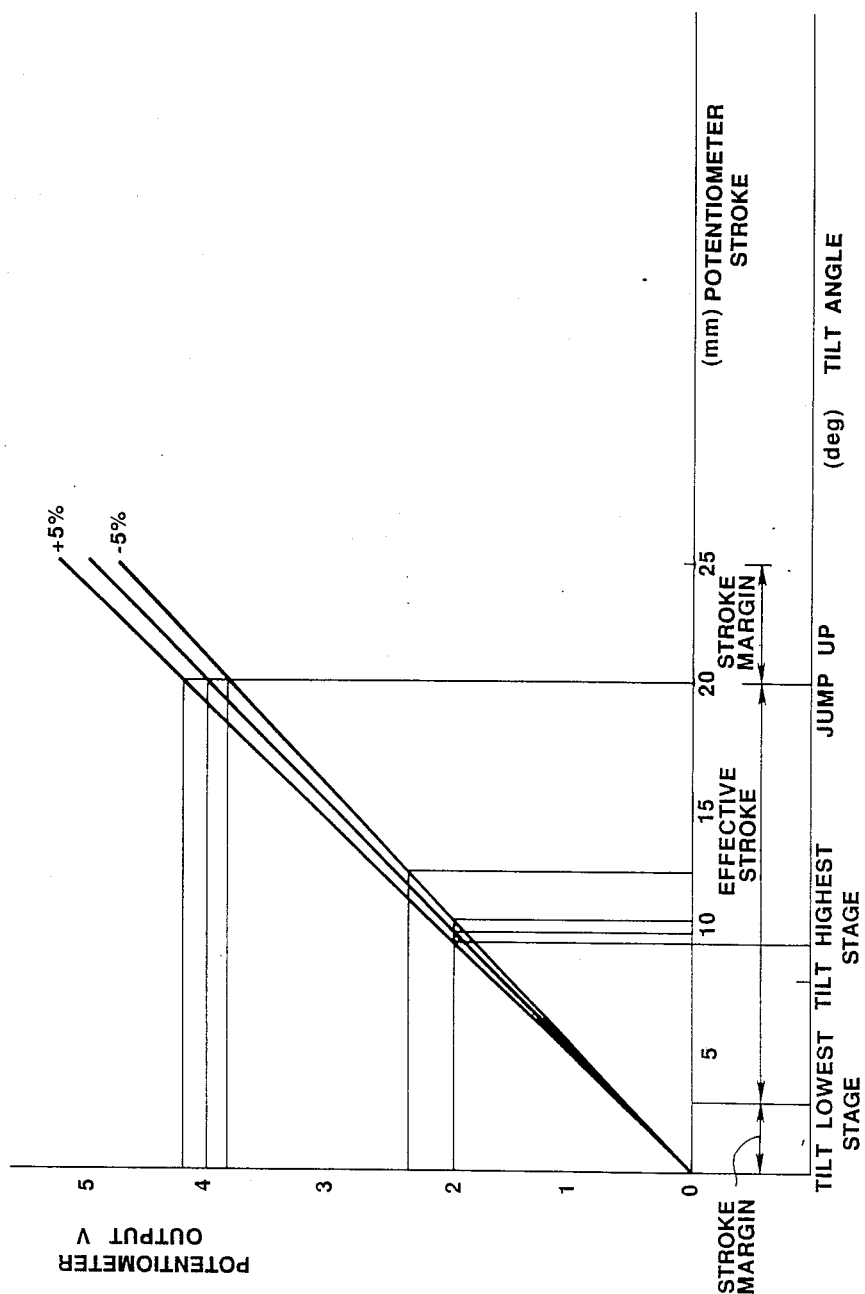

A potentiometer 13 as a tilt position sensor of the steering wheel is installed within a slider 19, e.g., of the steering wheel SW. A displacement of the slider 19 is detected to determine a stroke angle of the steering wheel SW. That is to say, the potentiometer 13, as shown in FIG. 4, picks up a voltage across terminals b and c by sliding a wiper (terminal a) on a resistance element interlocked with a displacement of the slider 19. The potentiometer 13 has a linearity of an output voltage to stroke as shown in FIGS. 5 and 6 and has a tolerance of ±5%. As appreciated from FIGS. 5 and 6, this effect becomes reduced at a low-output voltage side, i.e., at an earth (ground) side (terminal b side of FIG. 4). Hence, in this embodiment, a jump up position A of the steering wheel SW is placed at an earth (grounded) side of the potentiometer 13 and sampled with the position A as a reference of control.

Suppose that the position A side has 5 V voltage. In this case, a voltage at the position A to be sampled has a large error. With this value as the reference, an accurate uppermost position C cannot be obtained so that the position A may not fall within a range of the air bag appropriate operation range. However, with the structure of the potentiometer 13, a relatively accurate uppermost stage position C can be obtained. It is noted that, as shown in FIG. 6, the same effect can be achieved with the tilt lowermost stage position B placed at the earth (grounded) side.

In addition, positioning means SI (microcomputer 1) positions generates and transmits a drive command to the steering motor 15 to place the steering wheel at the jump up position A (refer to FIG. 5) and/or to the lowest stage position (refer to FIG. 6) of the driving posture while the power supply of a battery BT is connected to the positioning means SI. The output signal of the potentiometer 13 is stored into memory means ME to control this value as a reference. Hence, it is possible to control the position of the steering wheel without influences of mounting errors, assembly errors of the length of the resistance element.

When the steering wheel SW is automatically returned from a escape posture A to driving postures C through B, the steering wheel is returned to the uppermost stage position C of the driving posture. In addition, the operation with the manual switch 9 is possible only between the uppermost stage position C and uppermost stage position B. Therefore, the appropriate operation of the air bag can be expected.

The following explains operational flowcharts in the first preferred embodiment will be described with reference to FIGS. 7 and 8.

Figure 7:
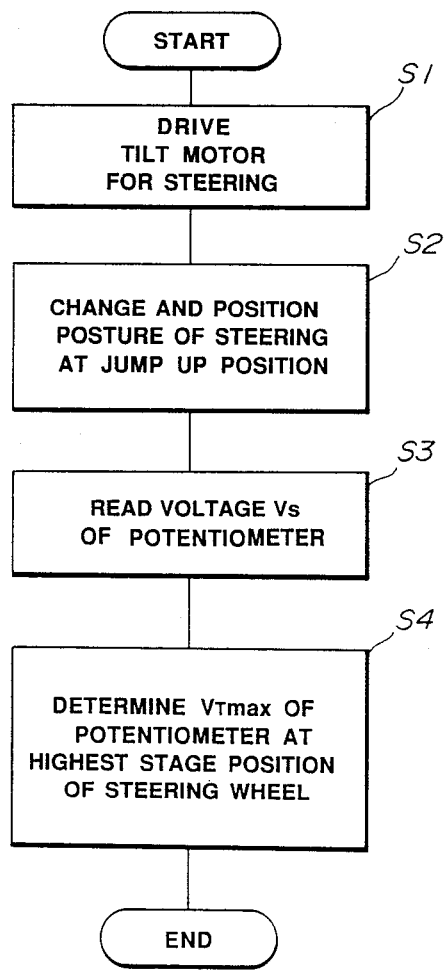
FIGS. 7 and 8 are operational flowcharts executed in the circuit shown in FIG. 1.
Figure 8A:
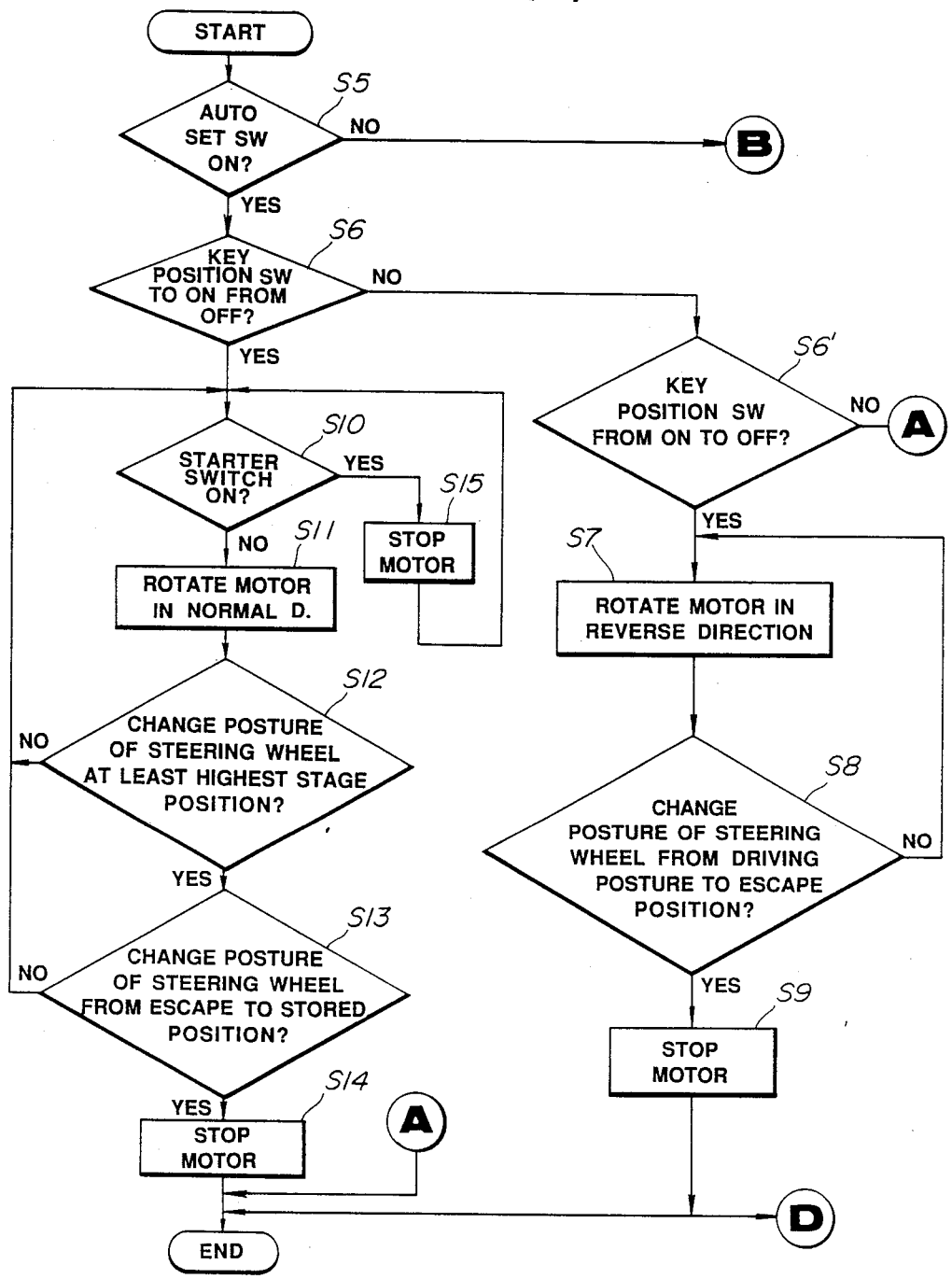
Figure 8:
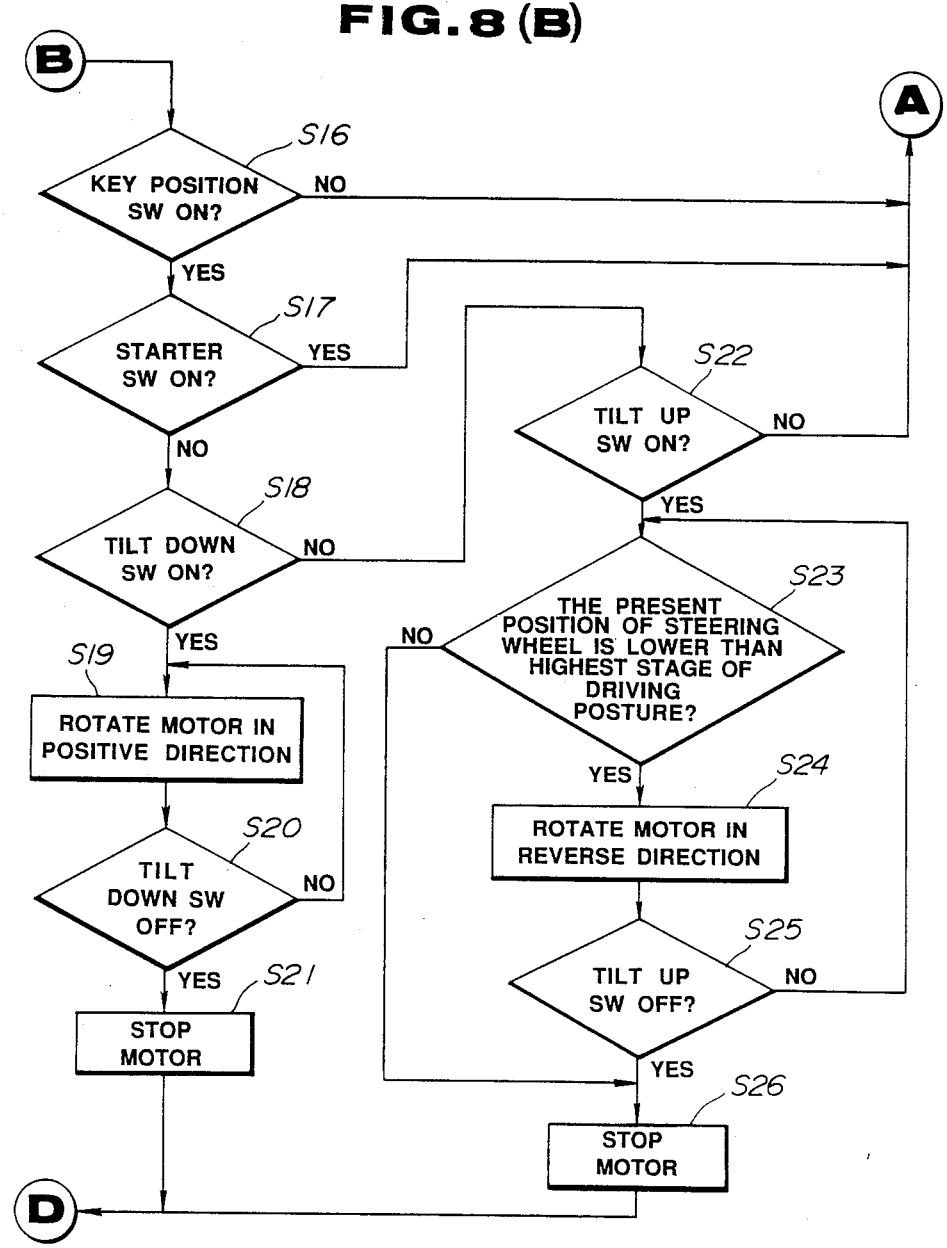

The microcomputer 1 executes the program flowchart shown in FIG. 7 in response to an interrupt generated for a predetermined time when the battery BT is connected to the power supply of the system and the power supply is turned 0 (the battery BT is connected to the positioning means SI).

FIG. 7 shows an initialization program executed by the microcomputer 1.

In the initialization, an output signal of the potentiometer 13 at either position of the lowermost stage position B or the jump-up position A of the steering wheel SW is stored in the microcomputer 1 so that the uppermost position C of the driving posture is set and controlled on the basis of the stored value thereof.

Consequently, deviations of detections due to the manufacturing error and mounting error of the potentiometer 13 can be prevented.

When the battery BT is connected to the positioning means SI, the steering tilt motor 15 is rotated in a step S1. The posture of the steering wheel SW, e.g., to the jump-up position A is changed and positioned in a step S2. The microcomputer 1, at this time, reads a voltage $V_s$ of the potentiometer 13 in a step S3.

In a step S4, a voltage $V_{Tmax}$ ($=V_S-V_T$) of the potentiometer 13 at the driving posture uppermost stage position C is set from the voltage $V_S$, a difference voltage $V_T$ (predetermined by an experiment) between the jump-up position A and uppermost stage position C, and the driving posture uppermost position C.

Figure 10A:
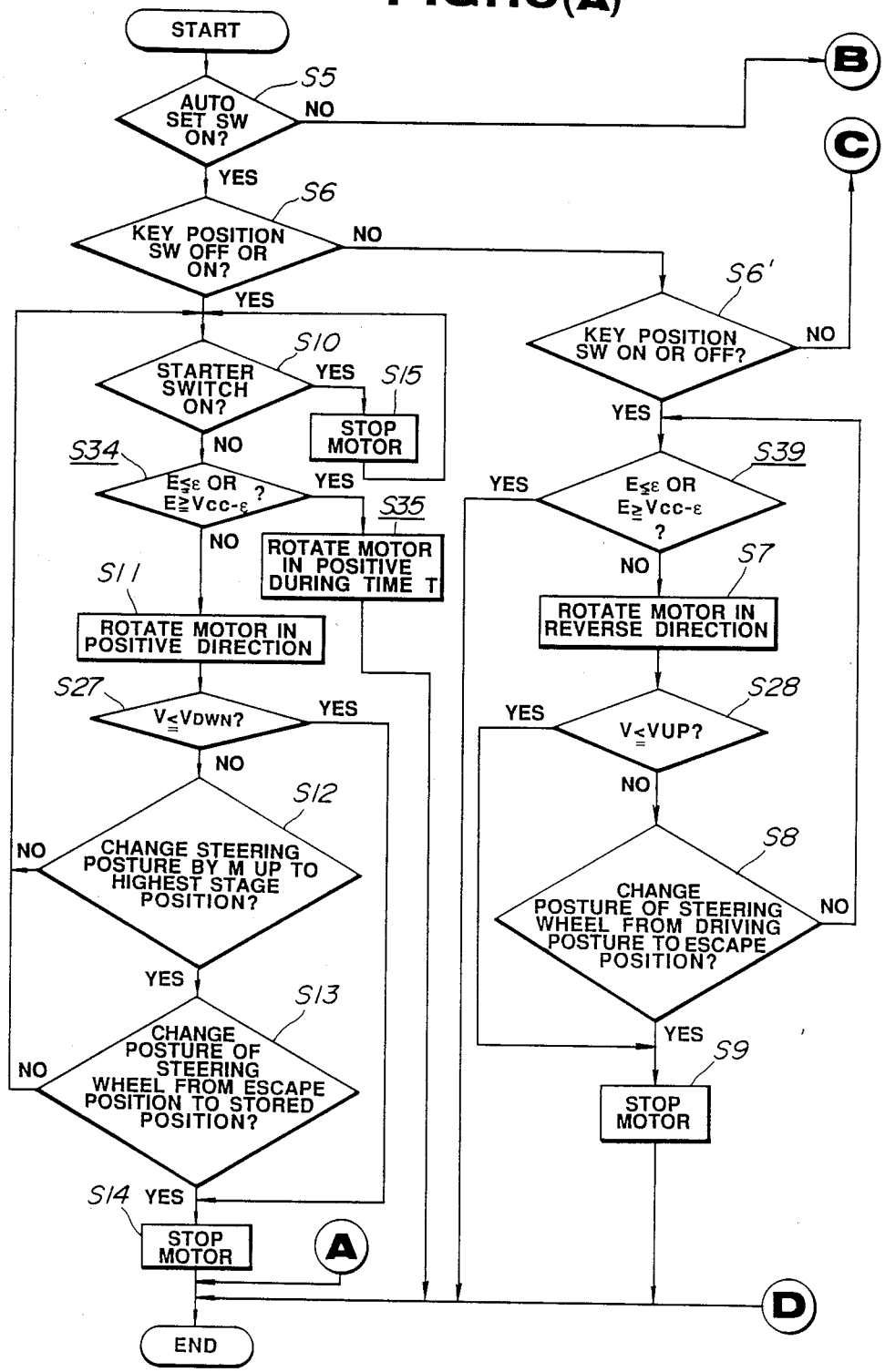
FIG. 10 is an operational flowchart executed in a third preferred embodiment of the steering wheel posture controlling system.
Figure 10B:
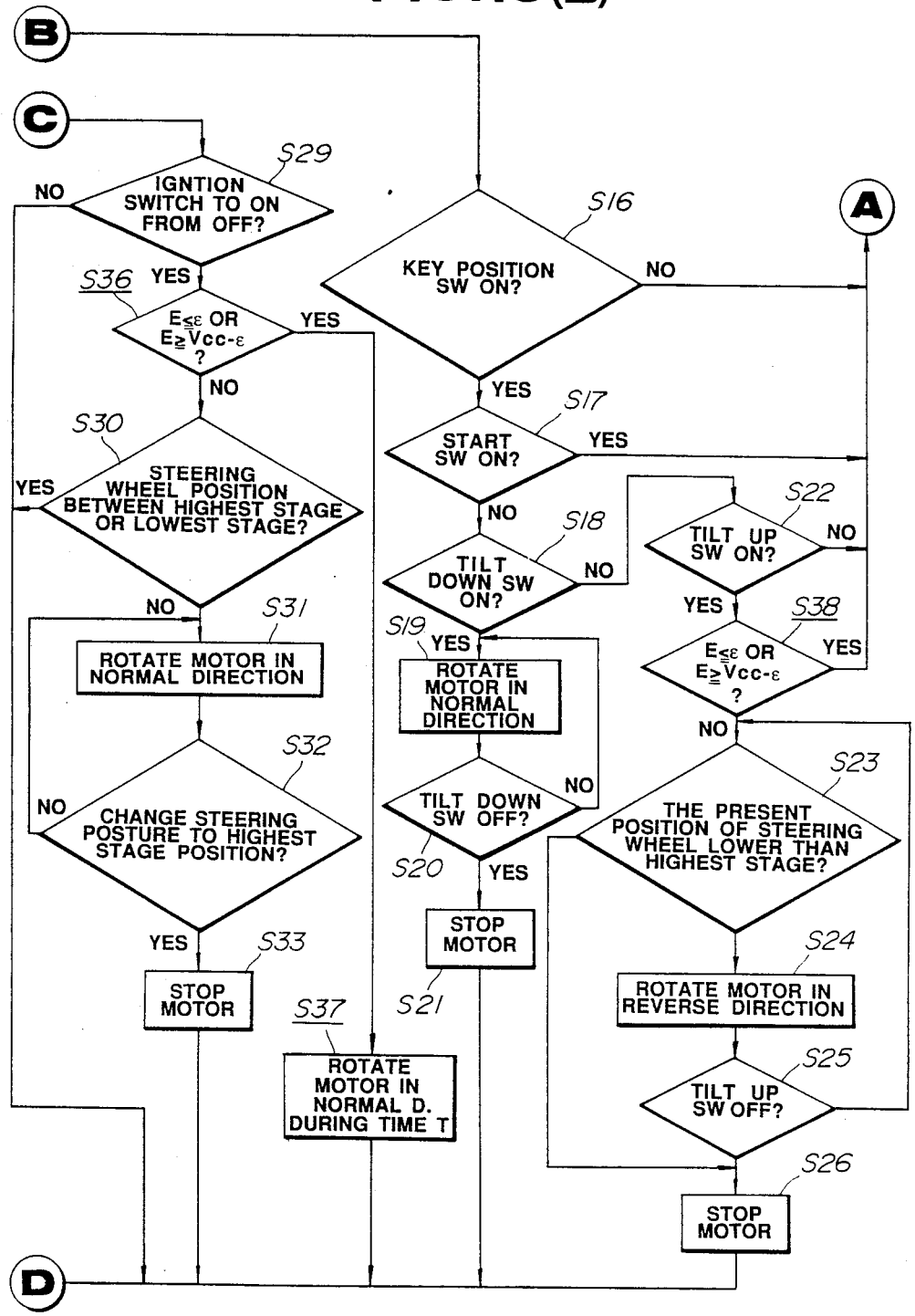

Next, when the ignition key is inserted when the driver gets off the vehicle, the flowchart shown in FIG. 10 is executed in response to the interrupt generated for a predetermined time.

In a step S5, the microcomputer 1 determines whether the auto set switch 5 is turned to ON or OFF. It is noted that when the auto set switch 7 is turned to ON, an away control and return control of the steering wheel SW are executed The microcomputer 1 determines whether the key position switch 5 is changed from OFF to ON in a step S6. When the driver gets off the vehicle, the ignition key is removed to place the key position switch 5 from ON state to OFF state. Therefore, since the determination of the step S6 indicates NO and the determination of the step S6' indicates YES. Therefore, the microcomputer 1 outputs the signal to rotate the steering tilt motor 15 in the reverse direction. Thus, the steering wheel SW changes its posture from the driving posture to the jump up position A in a step S8. The steering tilt motor 15 is stopped in response to the output signal from the microcomputer 1 and the steering wheel SW is fixed in a step S9. Hence, a space provided between the seat and steering wheel SW is widened so as to provide an easy getting off operation.

When the driver gets on the vehicle, the steering wheel SW is placed at the jump up position A during the vehicle driver getting on the vehicle. Thus, it becomes easy to get on the vehicle.

When the ignition key is inserted with the driver get off, the key position switch 5 is placed from the OFF position to the ON position and the routine goes to a step S10.

Figure 3:
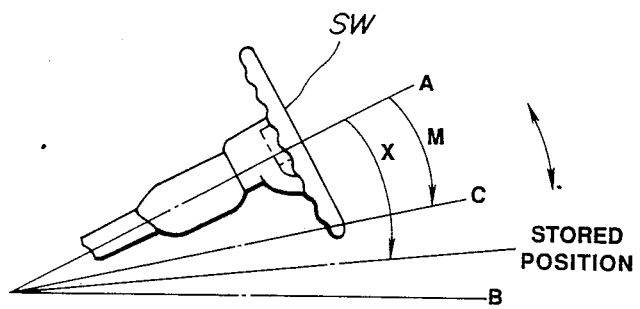
FIG. 3 is an explanatory view of a tilt angle of the steering wheel (with respect to a vehicle body).

The microcomputer 1 outputs the signal to rotate the steering tilt motor 15 normally since the starter motor switch 3 is turned to OFF when the ignition key is inserted but the starter operation is not carried out in a step S11. This output signal causes the steering tilt motor 15 to rotate normally so that the posture of the steering wheel SW is changed by a stroke M (refer to FIG. 3) from the jump up position A upto at least the uppermost stage position C in a step S12.

The posture of the steering wheel SW is changed by a whole stroke X (refer to FIG. 5) until the driving position at the time of the driver's getting off position at which is stored in the microcomputer 1 in a step S13.

Hence, the steering wheel SW falls in the range of the appropriate operation of the air bag 23 without failure.

The presence of a step S21 always falls in the appropriate range even when the driver at first gets on the vehicle.

In addition, when the posture of the steering wheel SW is changed toward the driving posture, the steering tilt motor 15 is stopped in response to the output signal derived from the microcomputer 1 in a step S14.

The steering wheel SW is automatically returned to the driving posture at the time of the driver's getting off. When the starter drive through the ignition key is carried out during the automatic return, the starter switch 3 is turned to ON. Thus, the steering tilt motor 15 is stopped in response to the output signal from the microcomputer 1 in a step S15. Hence, when the automatic returning of the steering wheel is interrupted, the starter can be operated in a stable state.

In a manual operation mode, the routine goes to the step S1 since the auto set switch 7 is changed from the OFF position to the ON position. The ON and OFF of the key position switch 5 are determined and the ON and OFF of the starter switch 3 are determined in the steps S16 and S17.

In cases where the posture of the steering wheel SW is adjusted toward the lower side, the microcomputer 1 outputs the signal to rotate the steering tilt motor 15 in the normal direction when the tilt down switch 9b is placed in the ON condition. The output signal causes the steering tilt motor 15 to rotate in the normal direction so that the driving posture of the steering wheel SW is changed toward the lowermost stage position B of the driving posture. When the tilt down switch 9b is turned to OFF, the steering motor 15 stops in steps S20 and S21.

In a case where the posture of the steering wheel SW is adjusted at the upper direction, the tilt-up switch 9a is turned to ON. The microcomputer 1 determines whether the present position of the steering wheel is placed at a position lower than the uppermost stage position C of the driving posture in steps S22 and S23. Then, in a case where the present position is placed at a position lower than the uppermost stage position C, the microcomputer 1 outputs the signal to reversely rotate the steering tilt motor 15. Thus, the steering tilt motor 15 is rotated in the reverse direction and the posture of the steering wheel SW is changed toward the uppermost stage position C in a step S24.

When the tilt-up switch 9a is turned off, the steering tilt motor 15 stops in steps S25 and S26. When the present position of the steering wheel SW has reached the uppermost stage position C of the driving posture due to the rising operation, the steering tilt motor 15 is not rotated even when the tilt up switch 9a is turned to ON in steps S23 and S26.

Hence, the adjustment of the steering wheel SW toward the upper direction is possible only when the present position of the steering wheel SW is present between the uppermost stage position B and uppermost stage position C of the driving posture. It is impossible to adjust the driving posture toward the upper side higher than the uppermost stage position C.

Therefore, the system according to the present invention can assure the normal operation of the air bag although the posture of the steering wheel SW is changed toward the escape posture and the space for getting on and off the driver is widened to enable improvement in the easiness in getting on and off the vehicle.

It is noted that the meaning of operation by means of the operating means is placed between the lowest stage position and highest stage position of the driving posture includes setting and controlling with a more limited range therebetween.

Figure 9A:
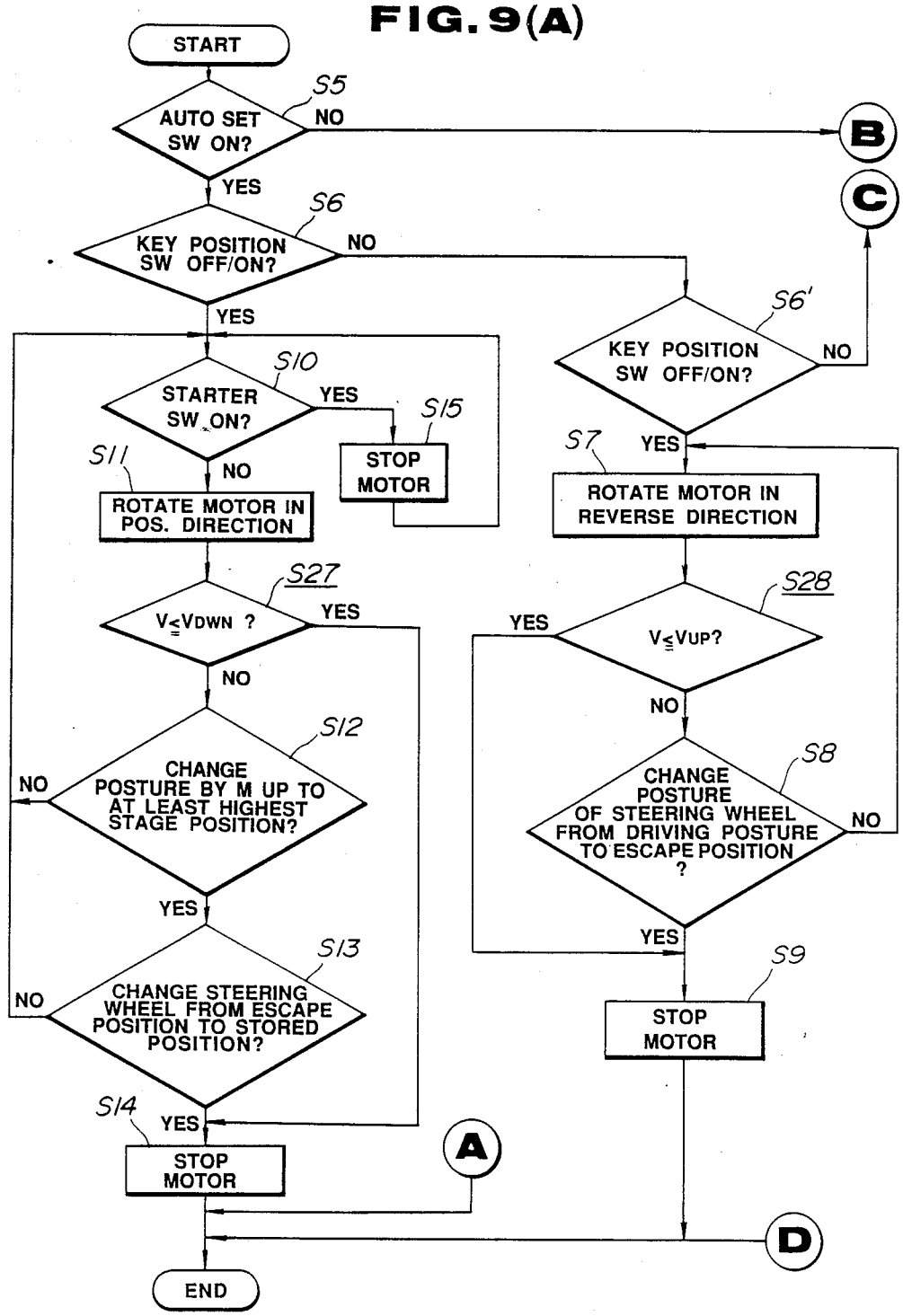
FIG. 9 is an operational flowchart executed in a second preferred embodiment of the steering wheel posture controlling system according to the present invention.
Figure 9B:
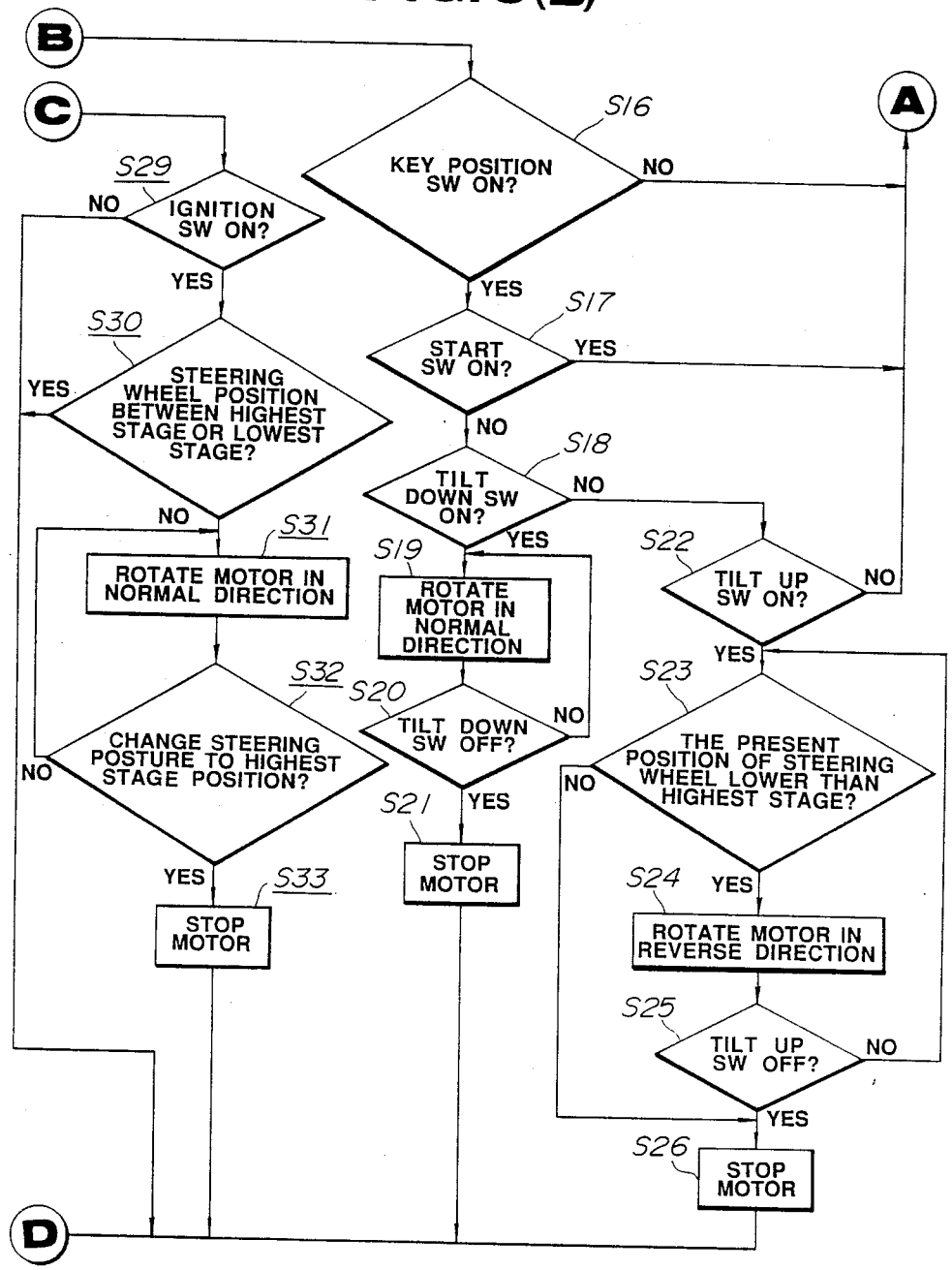

FIG. 9 shows a program flowchart in a second preferred embodiment of the steering wheel posture controlling system.

In the second preferred embodiment, in a case where an overload is generated onto the steering wheel SW during the change in posture of the steering wheel SW, the change in posture is halted. The posture of the steering wheel SW is automatically changed to the uppermost stage position C when the vehicle is started to run even when the steering wheel SW falls in a position between the uppermost stage position C and uppermost stage position B due to such a stop as described above.

Hence, as shown in this flowchart of FIG. 9, the microcomputer 1 newly adds steps S27 through S33. The other steps are the same as those shown in FIG. 8. Therefore, since the same steps function in the same way as those shown in FIG. 8, the overlapped explanations are omitted here.

When the ignition key is inserted into the key hole, the steering wheel SW is transferred into the jump up position A to the uppermost stage position C in steps S6 through S12.

When the operation speed v of the steering tilt motor 15 is below a detected reference value $V_{DWN}$, the motor 15 immediately stops in the steps S27 and S14.

It is noted that the reason that the microcomputer 1 determines whether the operational speed v of the motor 15 is below the detected reference value $V_{DWN}$ is to determine whether an overload is generated on the motor 15.

If the detected reference value $V_{DWN}$ becomes large, the detected reference value of the overload becomes small. The operational speed v of the motor 15 can be continued, e.g., by sampling a value of the potentiometer 13 at a regular time.

Hence, when the steering wheel SW goes down upto the uppermost stage position C, the downward movement of the steering wheel is immediately stopped even if an occupant whose physical dimension is large is sandwiched against a lower part of the steering wheel SW so that the safety of the occupant can be assured.

In the same way, during an automatic change in posture toward the jump up position A of the steering wheel SW at the time of the driver's getting off the vehicle, an overload is acted upon the steering wheel SW due to such as the driver's handling on the steering wheel SW. The motor 15 is immediately stopped due to the determination that the operational speed v of the motor 15 is below the detected reference value $V_{UP}$ in steps S28 and S9.

It is also noted that the detected reference values $V_{UP}$ and $V_{DWN}$ are set to make an equation of $V_{UP} < V_{DWN}$. Hence, as the detected reference value of the overload is such that the detected reference value of the overload is set smaller than the detected reference value during the change in posture of driving. When the steering wheel SW goes down, a friction of a weight and driving system of a steering column is applied. Furthermore, since the motor rotates normally, a stronger force required to stop the downward movement when $V_{UP} = V_{DWN}$. If, in addition, in a case where a manual force causes the steering wheel SW to stop, the operation in which the steering wheel SW which is automatically returning toward the downward direction is lifted up or drawn up from the downward direction to the upward direction needs a stronger force than the operation in which the steering wheel SW automatically returning is drawn or pressed from the upward direction.

A proportion of the detected reference values $V_{DWN}$ and $V_{UP}$ is different according to the vehicle model but is set to about 10:3.

Hence, according to the setting of $V_{UP} < V_{DWN}$, the steering wheel SW can be stopped with the forces substantially equal to each other at the times of the vehicle's getting on and off the vehicle.

As described hereinabove, when the ignition key is inserted during the occupant's getting on and off the vehicle and the change in posture of the steering wheel toward the uppermost stage position C in steps S6 through S12, an overload is applied to the steering wheel SW. When the step S27 is executed, the change in posture of the steering wheel SW is immediately stopped. However, when the ignition key is rotated in the corresponding hole and the ignition switch 4 is turned on, the executions of the steps S29 through S33 cause the assured change in posture of the steering wheel SW upto the uppermost stage position C which can exhibit the assured operation of the air bag 23.

That is to say, even if, due to the overload, the change in posture of the steering wheel SW is stopped in the midway through the position A C of FIG. 5, the microcomputer 1 determines that the vehicle is in the running state (including the run possible state) by the turning on of the ignition switch 4 through the running detecting means SD in a step S29. If the vehicle is in the running state or in the running possible state, the microcomputer 1 determines whether the steering wheel SW is placed between the uppermost stage position C and lowermost stage position B in a step S30.

If the steering wheel SW is not placed between the positions B and C, the motor 15 is rotated in the normal direction in a step S31. After the change in posture of the steering wheel SW is carried out upto the uppermost stage position C, the motor 15 is stopped in steps S32 and S33.

In this way, even when the steering wheel SW is stopped due to the overload at the time of the driver's getting on the vehicle, the change in posture of the steering wheel SW upto the uppermost stage position C during the run of the vehicle and the function of the air bag can positively be carried out.

It is noted that since the microcomputer 1 determines that the vehicle is in the running possible state and this is determined from the ON state of the ignition switch 4, the change in posture of the steering wheel SW upto the uppermost stage position C is carried out so that the assured function of the air bag 23 can be achieved.

FIG. 10 shows an operational flowchart of a third preferred embodiment according to the present invention.

In the third preferred embodiment, the microcomputer 1 automatically changes the posture of the steering wheel SW to the lowermost stage position B when the detection in the position of the posture of the steering wheel SW becomes impossible. When the manual operation by means of the operating means OP is executed, the steering wheel SW is operated only in the downward direction.

Hence, in the third preferred embodiment, the steps S34 through S39 are newly added. The other steps are the same as those shown in FIGS. 9 and therefore the same explanation will be omitted here.

The determining means JM which determines that the detection of the steering wheel's posture is impossible is constituted by the microcomputer 1 which determines whether a wired line breakage and/or short-circuiting of the potentiometer 13.

Figures 11, 12:
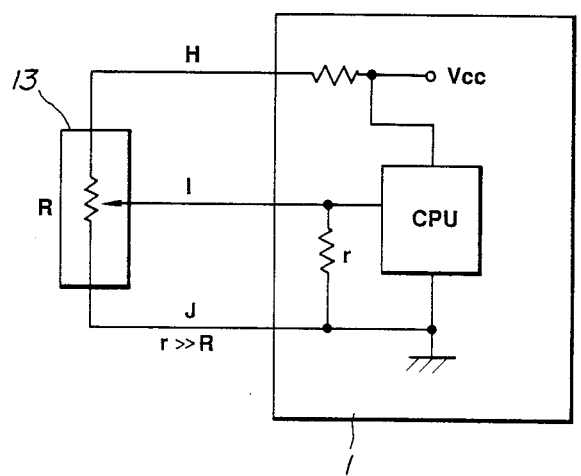
FIG. 11 is a wiring diagram of the potentiometer used in each of the preferred embodiments.
FIG. 12 is a table for explaining a broken line of the wiring and short-circuiting in the potentiometer.

FIG. 11 shows a wiring structure of the potentiometer 13.

Suppose that a terminal voltage $V_{cc}$ of the wiring H for the wirings of H, I, and J in the potentiometer 13, a resistor of the potentiometer 13 is denoted by R, a resistor between the wirings I and J is denoted by, and the resistance value of r is sufficiently large as compared with the resistor R of the potentiometer 13.

In a case where the breakage of any one of the wirings H, I, and J occurs, the detected voltage $E_{out}$ of the potentiometer 13 indicates respectively 0, 0, and $V_{cc}$. In a case where the circuit is short-circuited, the voltage $E_{out}$ indicates zero. For the short-circuiting of the wiring J, the potentiometer 13 operates normally since the wiring J is placed at the earth side (grounded).

Hence, if zero or $V_{cc}$ of the table of FIG. 12 is detected, the potentiometer 13 does not operate normally due to the breakage or short-circuiting. Therefore, the microcomputer 1 can determine that the detection of the position in posture of the steering wheel SW becomes impossible.

In this case, a set value $\epsilon(=0.1 \text{ V})$ for the detected voltage $E_{OUT}$ of the potentiometer 13 is provided and the microcomputer determines the breakage in wires or short-circuiting of the wirings H and I by $E_{OUT} \leq \epsilon$ and the breakage in wire J as $E_{OUT} \geq V_{cc} - \epsilon$.

Hence, when the change in posture of the steering wheel SW is carried out from the escape position to the uppermost stage position C (steps S6 through S12), the microcomputer 1 determines that the breakage in the wires H, I, and J of the potentiometer 13 occurs in a step S34. The motor 15 rotates normally during the set time T in a step S35. The posture of the steering wheel SW is changed upto the lowermost stage position B.

Hence, irrespective of the breakage or short-circuiting of the wires H, I, and J of the potentiometer 13, the change in posture of the steering wheel SW can automatically be carried out upto a position at which the function of the air bag 23 can be exhibited. At this time, it is possible to stop the motor 15 by the increase in load on the motor 15 or detection of a limit switch when the steering wheel posture is changed upto the uppermost stage position B.

In addition, when a breakage or short-circuiting is not generated in any one of the wirings H, I, and J during the vehicle driver's getting on the vehicle and the overload is generated in a midway through the steering wheel SW which is changed upto the uppermost stage position C, the steering wheel SW is stopped at a space between A and C in a step S27.

Next, when the microcomputer 1 determines that the vehicle is in the running state or in the running possible state in a step S29, the posture of the steering wheel SW is changed upto at least uppermost stage position C in steps S30 through S32. At this time, the breakage or short-circuiting of any one of the wirings H, I, and J of the potentiometer 13 is detected in the step S36. During the set time T, the motor 1 rotates normally in a step S37. The change in posture of the steering wheel SW is carried out upto the lowest stage position B.

When, with the manual switch 9 operated, the microcomputer 1 determines that the breakage or short-circuiting in the same way occurs in a step S38, a tilt up switch 9a is cancelled and a tilt-up operation of the steering wheel SW through a manual switch 9 becomes impossible.

The operation of the manual switch 9 causes the steering wheel SW placed between positions B and C not to be changed to the space between the positions A and C. Hence, the air bag 23 can assuredly be functioned.

In steps S6' through S9, the posture of the steering wheel SW is not carried out when the motor 15 is immediately stopped.

It is noted that with the motor 15 stopped after the load on the motor 15 is increased, the steering wheel SW can be changed to the escape position A.

As described hereinabove, in the present invention, the posture of the steering wheel SW can be changed toward the escape position if the ignition key is removed. In addition, if an ignition key is inserted, the posture of the steering wheel SW can automatically be changed toward the driving posture so that the easiness in getting on and off the vehicle can remarkably be assured.

In addition, the movement of the steering wheel is stopped immediately when a strong force is generated by applying the manual force onto the steering wheel SW during the change in posture. The change in posture of the steering wheel can easily be stopped.

Upon detection of the vehicle's running state, the position of the steering wheel can be corrected upto at least the uppermost stage position.

In a case where the manual operation of the steering wheel causes the steering wheel posture to be changed, it becomes only possible to change the posture between the uppermost stage of the driving posture and lowest stage position.

In a case where the detection of the steering wheel posture is disabled, the posture of the steering wheel can be changed to the lowest stage position when the posture is changed from the escape posture to the driving posture.

Furthermore, in a case where the detection of the steering wheel posture becomes impossible, the manual operation by means of the operating means can be limited only to the downward movement. Hence, the function of the air bag can be exhibited with a simple construction in a case where the air bag is mounted.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for controlling a posture of a steering wheel for a vehicle, comprising:
    (a) a steering wheel system having a steering wheel which can change its posture with respect to a related occupant seat between a first position at which a vehicle driver can handle the steering wheel to drive the vehicle and a second position at which the steering wheel is jumped up to make it easy for the driver to get on and off the vehicle according to situations in which an ignition key is inserted into a corresponding key hole of the vehicle and in which the ignition key is removed from the corresponding key hole;
    (b) first means for setting a third position between a lowest limit of the first position and second position, the third position defined as a highest position limit at which the driver can handle the steering wheel;
    (c) second means for automatically returning the steering wheel at least to the third position from the second position when the ignition key is inserted into the corresponding hole;
    (d) third means for manually operating the steering wheel so as to adjust the steering wheel posture; and
    (e) fourth means for limiting the operation the steering wheel by the third means so as to enable the operation thereby only when the steering wheel is placed between the third position and lowest limit of the first position.

2. A system as set forth in claim 1, which further comprises fifth means for halting the automatic return of the steering wheel by the second means when an engine starter of the vehicle is operated.

3. A system as set forth in claim 2, which further comprises sixth means for positioning the steering wheel at either of the second position or the lowest position limit of the first position when a vehicle battery is connected to the system; seventh means for detecting and storing the positioned position thereinto by the sixth means; and, eighth means for controlling the position stored by the seventh means as a reference.

4. A system as set forth in claim 3, which further includes ninth means for determining whether the detection of the position of the steering wheel is disabled; and tenth means for limiting the operation of the third means only toward its downward direction when the ninth means determines that the detection of the position of the steering wheel is disabled.

5. A system as set forth in claim 3, wherein the seventh means includes a potentiometer.

6. A system for controlling a posture of a steering wheel for a vehicle, comprising:
    (a) steering wheel system having a steering wheel which can change its posture with respect to a related occupant seat between a first position at which a vehicle driver can handle the steering wheel to drive the vehicle and a second position at which the steering wheel is jumped up to make it easy for the driver to get on and off the vehicle according to situations in which an ignition key is inserted into a corresponding key hole of the vehicle and in which the ignition key is removed from the corresponding key hole;
    (b) first means for setting a third position between a lowest limit of the first position and second position, the third position defined as a highest position limit at which the driver can handle the steering wheel;
    (c) second means for automatically returning the steering wheel at least to the third position when the ignition key is inserted into the corresponding hole;
    (d) third means for detecting whether an overload is generated on the steering wheel during the change in posture of the steering wheel;
    (e) fourth means for halting the change in posture of the steering wheel when the third means detects the generation of the overload on the steering wheel;
    (f) fifth means for detecting a vehicle run; and
    (g) sixth means responsive to the detection of the vehicle run for driving the steering wheel to automatically change in posture of the steering wheel at least toward the third position when the position of the steering wheel is not placed between the third position and lowest limit of the first position.

7. A system as set forth in claim 6, wherein a value of a reference of the detection by the third means is divided into each of those during the change in posture toward the second position and during the change in posture toward the driving posture and wherein the reference value of the detection by the third means toward the driving posture is set lower than the reference value of the detection during the change in posture during the change in posture toward the second position.

8. A system as set forth in claim 7, which further includes an air bag operated for preventing the vehicle driver from colliding against the steering wheel.

9. A system for controlling a posture of a steering wheel, comprising:
   (a) a steering wheel system having a steering wheel which can change its posture with respect to a related occupant seat between a first position at which a vehicle driver can conveniently handle the steering wheel and a second position at which the steering wheel is jumped up so as to make the steering wheel impossible to handle according to situations in which a key to operate the system is inserted into a corresponding key hole and in which the key is removed from the corresponding key hole to make inoperative the system;
   (b) first means for setting a third position between a lowest limit of the first position and second position, the third position defined as a highest position limit at which the driver can handle the steering wheel;
   (c) second means for automatically returning the steering wheel at least to the third position when the key is inserted into the corresponding hole;
   (d) third means for manually operating the steering wheel so as to adjust the steering wheel posture to make appropriate for the driving; and
   (e) fourth means for limiting the operation of the steering wheel by the third means so as to enable the operation thereby only when the steering wheel is placed between the third position and lowest limit of the first position.

10. A system as set forth in claim 9, wherein the key is an ignition key for a vehicle and the second position of the steering wheel is defined as an escape position at which the driver can get on and off the vehicle with easiness and wherein air bag means are mounted so as to operate such that the vehicle driver cannot collide with the steering wheel when an inertia is impinged on the vehicle.

11. A method for controlling a steering wheel posture for a vehicle, comprising the steps of:
   (a) providing a steering wheel system having a steering wheel which can change its posture with respect to a related occupant seat between a first position at which a vehicle driver can handle the steering wheel to drive the vehicle and a second position at which the steering wheel is jumped up to make it easy for the driver to get on and off the vehicle according to situations in which an ignition key is inserted into a corresponding key hole of the vehicle and in which the ignition key is removed from the corresponding key hole;
   (b) setting a third position between a lowest limit of the first position and second position, the third position defined as a highest position limit at which the driver can handle the steering wheel;
   (c) automatically returning the steering wheel at least to the third position from the second position when the ignition key is inserted into the corresponding hole;
   (d) manually operating the steering wheel so as to adjust the steering wheel posture; and
   (e) limiting the operation of the steering wheel in the step (c) so as to enable the operation therein only when the steering wheel is placed between the third position and lowest limit of the first position.

* * * * *